United States Patent Office 3,413,083
Patented Nov. 26, 1968

3,413,083
PROCESS FOR THE PREPARATION OF
MIXED OXIDES
Gustav Daendliker, Birsfelden, Switzerland, assignor to Ciba Limited, Basel, Switzerland, a company of Switzerland
No Drawing. Filed Nov. 3, 1965, Ser. No. 506,278
Claims priority, application Switzerland, Nov. 11, 1964, 14,523/64
6 Claims. (Cl. 23—24)

ABSTRACT OF THE DISCLOSURE

A new process is provided for the manufacture of mixed oxides which contain in the cation one or more of the following elements: alkali or alkaline earth metal, lead, zinc, cadmium and rare earths, and which contain one or more of the folowing elements in the anion: aluminum, tin, iron, titanium, zirconium, hafnium, molybdenum, tungsten and antimony. The mixed oxides are obtained by dissolving the alcoholates of the elements in stoichiometric proportions in an anhydrous organic solvent to form mixed alcoholates. The mixed alcoholate is separated from the solvent, preferably by precipitation, with concentrated ammonia and the alcoholate is pyrolyzed to form the oxide.

The oxides of this invention have well-known uses in the art. For example, the oxides may be employed to form corrosion and oxidation resistant coatings.

---

The present invention relates to a process for the preparation of mixed oxides.

In particular the process relates to the preparation of mixed oxides of metals which form alcoholates which are soluble in polar organic solvents.

Further, the invention relates to the preparation of thin layers, coatings and impregnations consisting of the said oxides.

In particular, the invention relates to a process for the preparation of mixed oxides of the type of alkaline earth titanates and zirconates, and especially barium and strontium titanate and zirconate.

Mixed oxides, e.g. of the type of alkaline earth titanates and zirconates, possess valuable pyroelectric properties.

Again, others, e.g. $BaFe_{12}O_{19}$, are of interest because of their magnetic properties.

Many of the mixed oxides prepared according to the invention are chemically very inert and are therefore usable as corrosion resistant and oxidation resistant materials, mainly in the form of coatings.

Again, other mixed oxides are, in a suitable form e.g. deposited on a carrier material, suited to catalytic applications.

Up to the present the composite oxides have been produced by various processes which show certain disadvantages.

One of the processes, the so-called ceramic firing process, is characterised by sintering a mixture of the starting oxide, or of oxygen-containing salts of the corresponding metals. The sintering takes place at appropriately high temperatures, for example above 800 to 900° C., e.g. according to the following equation:

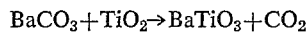

The mixtures may be produced by mixing and grinding or by coprecipitation.

The disadvantage of this process is that very high temperatures are needed for the sintering. As a result, low temperature modifications can only be produced with difficulty and amorphous forms cannot be produced at all.

In many cases the two reaction components have different volatilities which renders difficult the maintenance of stoichiometric proportions on sintering.

A further process for the preparation of mixed oxides has been described by Flaschen [J. Am. Chem. Soc. 77, 6194 (1955)]. According to this, one starts, for example, with an aqueous solution of barium hydroxide, which is maintained at a pH value of 11 to 14 by means of potassium hydroxide, in order to prepare barium titanate. The dropwise addition of titanium alcoholate causes the precipitation of the barium titanate which is filtered, washed, and dried or ignited as required. The process exhibits the technical disadvantage of large volume of solution. Since barium hydroxide has a low water solubility (5.6 g./l. at 15° C.) it is necessary, as already mentioned, to react large volumes.

A further disadvantage of the process is that barium hydroxide is always present in excess, which is accompanied by the possibility of inclusions. Further, a non-volatile third component is present, which has carefully to be washed out.

A further process which has already been suggested for the preparation of barium titanate consists of boiling barium methylate with titanium methylate in methanol under reflux (cf. United States Patent No. 3,065,049). Since titanium methylate is not soluble in methanol one obtains, at the best, a mixture of barium titanate with titanium methylate. The method is thus not practicable.

A further method of preparation of mixed oxides consists of the pyrolysis of double salts [cf. Boulanger; Compt. rend. 202, 21 to 56 (1936); and Clabough et al., J. Res. Nat. Bur. Stand. 56, 289 (1956)]. According to these authors, barium titanate can be produced by pyrolysis of barium titanyl oxalate.

Astanov [Russ. J. Inorg. Chem., Engl. transl. 8, 716 (1963)] produced barium zirconate by pyrolysis of barium zirconyl carbonate. The disadvantage of this method is that it requires the preparation of very pure starting compounds (double salts) and also depends on high pyrolytic temperatures. The method is restricted to those mixed oxides which are predetermined by the stoichiometry of the double salts.

It has now been found that mixed oxides of the aforementioned type can be obtained by very simple methods.

The subject of the present invention is therefore a process for the preparation of mixed oxides which contain, in the cation, one or more of the following elements: alkali or alkaline earth metals, lead, zinc, cadmium or rare earths, and which contain in the anion one or more of the following metals: aluminum, tin, iron, titanium, zirconium, hafnium, molybdenum, tungsten and antimony, and is characterised by dissolving the alcoholates of the elements present in the mixed oxides, in stoichiometric proportions, in an anhydrous organic solvent, and submitting the mixed alcoholates obtained, optionally after hydrolysis in the solid or liquid state, to a pyrolytic after-treatment.

The conversion of the mixed alcoholates obtained from solution to the liquid or solid state can take place by distilling off the solvent or by precipitation with ammonia. In the former case, a homogeneous alcoholate mixture remains. This homogeneous mixture can pyrolytically be freed from the alcohol group and converted to the mixed oxide under mild conditions, with the following equation symbolically indicating the reaction:

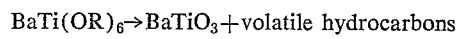

The pyrolysis can be carried out at a temperature above 200° C. preferably between 400 and 800° C.

It is also possible to distill off the alcohol group by hydrolysis with steam, prior to pyrolysis. This for example takes place on allowing the alcoholate solution to dry in moist air, and takes place according to the following equation:

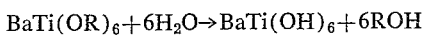

In that instance, water is eliminated on pyrolysis, e.g. according the following equation:

If precipitation from the alcoholate solution is caused by addition of concentrated ammonia, a completely homogeneous precipitate is obtained. In contrast thereto, one obtains by Flaschen's method, an inhomogeneous precipitate because the ratio of the components in the solution and in the precipitate is constantly changing. Since the precipitation itself is brought about by a third, volatile and non-coprecipitating material, this also ensures the homogeneity of the precipitate. Following the precipitation, the precipitate is subjected to pyrolysis.

Possible alcholates are the derivatives of all alcohols containing less than 11 carbon atoms. Both primary and secondary as well as tertiary alcohols may be used. In those cases where insoluble alcoholates are formed the selection of alcohols is correspondingly limited, e.g. methanol has to be excluded in the case of the elements titanium and zirconium since their methylates are insoluble in organic solvents.

The solvents used are with advantage compounds having a polar character, such as acetonitrile, dimethylformamide, or dioxane, but aromatic hydrocarbons, such as benzene and toluene, are also suitable in certain cases. Alcohols are however by far the best, insofar as they do not cause a precipitate with the alcoholates, as is for example the case with methanol and titanium alcoholates. Apart from such exceptions, all alcohols of less than 11 carbon atoms, e.g. ethanol, propanol, isopropanol, butanol, tert-butanol, ethylhexanol and others, can be considered. The selection depends on the method to be used.

If the mixed hydrated oxides are precipitated with ammonia it is of advantage if the solvent is at least partially miscible with water.

If on the other hand the mixture to be pyrolysed is produced by drying of the solution, then higher alcohols, which have the advantage of inhibiting hydrolysis, may be used in certain cases. Naturally a mixture of such alcohols may also be used.

The advantages of the process of the present invention are obvious. The solubility of the alcoholates is considerable so that no large solution volumes are needed. The mixed oxides are produced at low temperature which renders not only the low temperature modifications, but even the amorphous form, of the mixed oxides accessible. The process is very broadly applicable and additionally shows the following considerable advantage:

Depending on the mixing ratio of the initial components, which is however always chosen to be a stoichiometric one, it is possible to obtain with one and the same elements final products of quite different composition.

The maintenance of stoichiometric ratios is possible without any difficulty.

Furthermore it is possible to use, instead of a single element, two or more different elements for the cation of the mixed oxide to be produced. The same also applies to metals which form the anion. This offers great variety for the composition of the mixed oxide to be formed. Thus e.g. one can produce mixed anions of zirconium and titanium or mixed cations of barium and lead.

The process of the invention is above all suited to the preparation of impregnations, coatings and thin layers. For this purpose the articles to be coated or impregnated are dipped into the solution of the mixed alcoholates and subsequently dried and heated. In order to increase the coating thickness the process can be repeated as often as desired. Instead of the dipping method a brushing or spray method can naturally also be used to apply the mixed alcoholates.

Furthermore the process is also suited to the impregnation of carrier materials, e.g. porous films, for example for the preparation of dielectrics. The process is also very well suited to the preparation of catalyst compositions. For this purpose, suitable carriers such as silica gel, kieselguhr, clays etc. may be treated with the mixed alcoholates, and thereafter the treated carriers are subjected to pyrolysis.

The following examples illustrate the invention.

Example 1

20.95 g. of titanium ethylate are dissolved in 300 ml. of anhydrous ethanol in a round flask, under an inert atmosphere. Thereafter 12.60 g. of barium are added; this gradually dissolves with evolution of hydrogen. The yellow solution so obtained is divided into three parts. Part 1 is poured into a shallow dish and allowed to dry. The dry translucent crust is ignited for 2 hours at 400° C., 1 hour at 600° C. and 1 hour at 700° C.

The X-ray diagram shows the characteristic lines of cubic $BaTiO_3$.

If the preparation is only ignited for 4 hours at 500° C., it remains amorphous to X-rays.

*Analysis.*—20.7% Ti (theor. for $BaTiO_3$, 20.55% Ti).

Example 2

Part 2 of the solution referred to in Example 1 is diluted to about 500 ml. with ethanol. 20 ml. of concentrated ammonia solution are then poured into it, with stirring. By adding about 300 ml. of water, a jellylike precipitate is obtained which can be flocculated by boiling. This is filtered off, dried and subsequently ignited as in Example 1.

On the basis of the X-ray diagram the product may be identified as cubic $BaTiO_3$.

*Analysis.*—20.3% Ti.

Example 3

Part 3 of the solution referred to in Example 1 is diluted to 300 ml. Thereafter square sheets of silver of size 10 x 10 x 0.1 mm. which can be held by a silver wire soldered to them, are dipped into the solution in a dry nitrogen atmosphere, then withdrawn, the excess solution allowed to drip off, and the sheets then dried in a stream of nitrogen. This process is repeated three times. In the case of bright sheets, the thin layer of the double alcoholate which is formed manifests itself by interference colours.

The sheets are thereafter ignited for 3 hours at 600° C. and 1 hour at 700° C. The covering layers so obtained can be identified, by X-ray crystallography, as the cubic modification of $BaTiO_3$. They are distinguished by the fact that high electrical field strengths may be applied to them.

$ZnAl_2O_4$, $Zn_2TiO$, $BaFe_{12}O_{19}$ and $Li_2ZrO_3$ may also be prepared in a manner analogous to Examples 1, 2 and 3.

Example 4

26 g. of titanium ethylate in 200 ml. of absolute alcohol are initially placed in a 500 ml. spherical flask having an attached reflux condenser. 22.1 g. of calcium metal and 3.9 g. of barium metal are then added and dissolved with cooling. A yellowish, clear solution remains, and this is concentrated by evaporation. The solution is then poured into a tray and allowed to dry in the air. The crusted material is slowly heated to above 100° C. and, after removing the organic material by volatilisation, is heat-treated for 4 hours at 800° C. The resulting white material, which contains in the cation fraction about 5 mol percent of barium and 95 mol percent of calcium, gives an X-ray diagram which is substantially identical with that of calcium titanate.

Example 5

28.4 g. of titanium n-propylate in 200 ml. of absolute n-propanol are initially placed in the apparatus described in Example 4. 8.7 g. of strontium metal are dissolved therein with cooling. The clear solution is divided into two parts. The first half has 50 ml. of tert.-butanol added thereto, and is then concentrated by evaporation and dried in air. The residue is heated to volatilise the remaining organic material and is then calcined for 4 hours at 800° C. The second half is diluted with about 200 ml. of methanol and concentrated ammonia solution is added with stirring. The precipitate which forms is filtered off, dried and heat-treated at 700° C.

Both products show the X-ray pattern characteristic of strontium titanate.

Example 6

In the apparatus described in Example 4, 11.1 g. of calcium chloride and 23.3 g. of zirconium tetrachloride are covered with thionyl chloride to remove moisture. The thionyl chloride is boiled for 3 hours under reflux and then removed in vacuo.

The salts dried in this way are suspended in 300 ml. of toluene and allowed to react, with cooling, with introduced ethylene oxide until a clear, colourless solution has formed. It is essentially the alcoholates of ethylene chlorhydrin which are formed. This alcoholate mixture is worked up in two halves, as described in Example 5.

The two products show the X-ray diagram characteristic of calcium zirconate.

What is claimed is:

1. A process for the preparation of a mixed oxide containing in the cation at least one element selected from the group consisting of alkali metals, alkaline earth metals, lead, zinc, cadmium and rare earths, and in the anion, at least one metal selected from the group consisting of aluminum, tin, iron, titanium, zirconium, hafnium, molybdenum, tungsten and antimony, which comprises dissolving stoichiometric amounts of an organic solvent-soluble alcoholate having 1–10 carbon atoms of said element and an organic solvent-soluble alcoholate having 1–10 carbon atoms of said metal in an anhydrous organic solvent to form a mixed alcoholate, precipitating a homogeneous mixture of said mixed alcoholate with ammonia, isolating said mixed alcoholate and pyrolyzing it to form said mixed oxide.

2. A process according to claim 1 wherein said solvent is an alcohol having up to 10 carbon atoms.

3. A process according to claim 1 wherein said solvent is a polar organic solvent selected from the group consisting of an alcohol having at the most 4 carbon atoms, acetonitrile, dimethylformamide and dioxan.

4. A process according to claim 1 wherein said mixed alcoholate is pyrolized at 200 to 800° C.

5. A process according to claim 1 which comprises using alkaline earth alcoholates and titanium alcoholates.

6. A process according to claim 1 which comprises using a barium alcoholate, a calcium alcoholate and a titanium alcoholate.

References Cited

UNITED STATES PATENTS

| | | | |
|---|---|---|---|
| 2,948,628 | 8/1960 | Wainer | 23—51 X |
| 2,985,506 | 5/1961 | Di Vita et al. | 23—51 |
| 3,292,994 | 12/1966 | Kiss et al | 23—51 |

FOREIGN PATENTS 569,081    1/1959    Canada.

OSCAR R. VERTIZ, *Primary Examiner.*

H. T. CARTER, *Assistant Examiner.*